United States Patent
Rhoades

(10) Patent No.: US 10,907,959 B2
(45) Date of Patent: Feb. 2, 2021

(54) TYRE TREAD DEPTH AND TYRE CONDITION DETERMINATION

(71) Applicant: PRE-CHASM RESEARCH LIMITED, Hale (GB)

(72) Inventor: Anthony David George Rhoades, Hale (GB)

(73) Assignee: Pre-Chasm Research Limited, Cheshire (GB)

( * ) Notice: Subject to any disclaimer, the term of this patent is extended or adjusted under 35 U.S.C. 154(b) by 127 days.

(21) Appl. No.: 16/372,976

(22) Filed: Apr. 2, 2019

(65) Prior Publication Data

US 2019/0226833 A1    Jul. 25, 2019

Related U.S. Application Data

(63) Continuation of application No. 15/114,562, filed as application No. PCT/GB2015/050176 on Jan. 27, 2015, now Pat. No. 10,247,543.

(30) Foreign Application Priority Data

Jan. 27, 2014    (GB) .................................. 1401352.8

(51) Int. Cl.
| | | |
|---|---|---|
| G06K 9/00 | (2006.01) | |
| G01B 11/22 | (2006.01) | |
| B60C 11/24 | (2006.01) | |
| G01M 17/02 | (2006.01) | |
| G01S 17/08 | (2006.01) | |

(Continued)

(52) U.S. Cl.
CPC ............ *G01B 11/22* (2013.01); *B60C 11/246* (2013.01); *G01M 17/027* (2013.01); *G01S 17/08* (2013.01); *G06T 7/0004* (2013.01); *H04M 1/72522* (2013.01); *H04N 5/2256* (2013.01); *H04N 5/23245* (2013.01)

(58) Field of Classification Search
None
See application file for complete search history.

(56) References Cited

U.S. PATENT DOCUMENTS

| | | | | |
|---|---|---|---|---|
| 6,034,676 A | * | 3/2000 | Egan ...................... | G01B 21/18 701/31.4 |
| 8,625,105 B2 | * | 1/2014 | Pryce ................... | G01B 11/245 356/601 |

(Continued)

FOREIGN PATENT DOCUMENTS

| | | |
|---|---|---|
| WO | 96/10727 | 4/1996 |
| WO | 96/37754 | 11/1996 |

(Continued)

OTHER PUBLICATIONS

Domènech, "Tyre Print Identification Through Registration Techniques and Attribute Graphs", Universitat Politècnica de Catalunya. Facultat d'Informàtica de Barcelona, 2013 (Master in Artificial Intelligence—MAI (Pla 2006)), 2013 (Year: 2013).*

(Continued)

*Primary Examiner* — Randolph I Chu
(74) *Attorney, Agent, or Firm* — Hartman Global IP Law; Gary M. Hartman; Domenica N. S. Hartman

(57) ABSTRACT

A method for assessing tyre tread depth and/or tyre condition by taking and analysing a camera image or images of a tyre using portable instrumentation.

15 Claims, 4 Drawing Sheets

(51) Int. Cl.
*G06T 7/00* (2017.01)
*H04M 1/725* (2006.01)
*H04N 5/225* (2006.01)
*H04N 5/232* (2006.01)

(56) References Cited

U.S. PATENT DOCUMENTS

| | | | | |
|---|---|---|---|---|
| 9,834,042 B2* | 12/2017 | Bogenschuetz | ....... | B60C 11/246 |
| 2012/0020526 A1* | 1/2012 | Teti | ....... | G06T 7/0004 |
| | | | | 382/104 |
| 2012/0169856 A1* | 7/2012 | Ahmed | ....... | G06Q 10/08 |
| | | | | 348/61 |
| 2013/0327135 A1* | 12/2013 | Russell | ....... | G01M 17/02 |
| | | | | 73/146.3 |
| 2014/0232852 A1* | 8/2014 | Nobis | ....... | G01N 21/95 |
| | | | | 348/128 |
| 2014/0303908 A1* | 10/2014 | Sotgiu | ....... | G01M 17/02 |
| | | | | 702/41 |
| 2015/0217522 A1* | 8/2015 | Ragula | ....... | B60C 11/00 |
| | | | | 152/209.1 |
| 2016/0114632 A1* | 4/2016 | Hellerud | ....... | B60C 11/246 |
| | | | | 280/63 |
| 2016/0121671 A1* | 5/2016 | Neau | ....... | B60C 99/006 |
| | | | | 703/6 |
| 2016/0193882 A1* | 7/2016 | Mancinelli | ....... | B60C 11/0316 |
| | | | | 152/209.12 |
| 2016/0250899 A1* | 9/2016 | Takahashi | ....... | B60C 19/00 |
| | | | | 73/8 |
| 2017/0091924 A1* | 3/2017 | Hasselbusch | ....... | G06T 7/60 |
| 2017/0124784 A1* | 5/2017 | Wittmann | ....... | B60C 23/06 |

FOREIGN PATENT DOCUMENTS

| | | |
|---|---|---|
| WO | 97/07380 | 2/1997 |
| WO | 00/42409 | 7/2000 |
| WO | 2010/100417 | 9/2010 |
| WO | 2013/156212 | 10/2013 |

OTHER PUBLICATIONS

International Preliminary Report on Patentability for International Application No. PCT/GB2015/050176, dated Aug. 2, 2016, (9 pages).

* cited by examiner

TYRE TREAD DEPTH AND TYRE CONDITION DETERMINATION

CROSS-REFERENCE TO RELATED APPLICATIONS

This is a continuation patent application of co-pending U.S. patent application Ser. No. 15/114,562, filed Jul. 27, 2016, which is the U.S. National Stage entry of International Application Number PCT/GB2015/050176 filed under the Patent Cooperation Treaty and having a filing date of Jan. 27, 2015, which claims priority to Great Britain Patent Application No. 1401352.8 having a filing date of Jan. 27, 2014. The contents of these prior applications are incorporated herein by reference.

BACKGROUND OF THE INVENTION

This invention relates to tyre tread depth and tyre condition determination.

Vehicle tyres are subject to wear and damage. Worn or damaged tyres can be dangerous on road vehicles, and tyres are checked in routine inspection such as the British Government's Ministry of Transport (MOT) annual test. Tyres that do not have a prescribed minimum tread depth will not pass the test. The annual check, however, means that the tyre could have been worn, and dangerous, for some months before.

It is, of course, the responsibility of the vehicle owner to maintain it, and particularly its tyres, in safe and roadworthy condition. Tyre condition, and, often, tyre inflation, are often overlooked, or not checked regularly enough. Worn or damaged tyres are implicated in around 50% of serious or fatal road injuries.

Tread depth gauges are readily available. They comprise a probe sliding in a cylinder. The probe is inserted into a tyre groove and the cylinder advanced till its end is in contact with the tread. The tread depth is read off a scale, which in some instances is on the other end of the probe projecting from the other end of the cylinder. Such a gauge is best used when the vehicle is on a ramp or when the wheel is off the vehicle, so that the entire width and circumference can be inspected—tyres are often subject to uneven wear through faulty tracking or wheel alignment. Using such gauges when the vehicle is on the road most often means kneeling, squatting or even lying on the ground, and even so only a small part of most tyres will be available for inspection.

Other proposals have been made for tyre inspection, some involving making an image from structured light illumination that can be analysed to give tyre surface contour information from which tread depth can be calculated. The image can be taken across the width of the tyre to detect uneven wear. One such proposal has the imaging arrangement let into a road surface.

There is no available provision, however, whereby tyre tread depth measurement and damage inspection can be carried out easily and objectively whether the tyre is on or off a vehicle and the observations and measurements recorded, that would be available to vehicle owners for regular monitoring or to law enforcement agencies for spot checks on parked vehicles.

BRIEF SUMMARY OF THE INVENTION

The present invention provides for fast, simple measurement carried out on an instrument that is readily available to motorist and enforcement agency alike.

The invention provides a method for assessing tyre tread depth and/or tyre condition by taking and analysing a camera image or images of a tyre using portable instrumentation.

The invention also comprises apparatus for assessing tyre tread depth and/or tyre condition comprising portable instrumentation adapted to take and analyse a camera image or images of a tyre.

The instrumentation may comprise portable communication equipment such as a mobile phone which may comprise a smartphone including a camera. However, a separate imaging device may be used in conjunction with a smartphone. Such separate imaging device may comprise a camera which can communicate with the smartphone as by Wi-fi.

The smartphone may be loaded with an app that controls or directs the control of a camera, whether a built-in smartphone camera or an auxiliary camera, to take a prescribed image or images. The app may contain image analysis software that can assess tread depth and tyre condition on board the smartphone and/or communicate image data to a remote computer adapted to make such assessment and communicate the assessment back to the smartphone.

The computer software may be comprised in an app for a camera-included smartphone adapted to analyse images made using the smartphone camera.

However, a smartphone app may control a tyre tread imaging process, images from which may be analysed in a remote computer, to which they may be sent from the smartphone over a network.

Advantageously, however, image control and analysis are carried out on a smartphone, whereby to generate an instant tyre tread depth report.

By "image control" is meant any one or more of: prescribing how an image or images should be taken, for manual camera operation; setting a camera imaging mode, including setting a flash mode; controlling an imaging accessory such as an auxiliary flash or other lighting device.

Prescribing how an image or images should be taken may include: prescribing an imaging sequence; prescribing an imaging mode; prescribing an imaging distance and/or orientation.

Setting a camera imaging mode may include: setting aperture and shutter speed controls; setting for single or multi-exposure; setting for photo or video; setting a scanning mode.

Setting a flash mode may include: setting for a single flash or multiple flashes; setting a flash intensity/time profile.

Methods which may be used to measure tread depth include: forming a stereo image by taking two or more images from spaced camera locations across the tyre width, using triangulation or other depth extraction methods; using structured light, as by projecting, from the built-in flash or an auxiliary illuminant, a line across the tread from a position displaced from the camera lens axis and computing tread depth from the observed displacement; using modulated light, as by illuminating the tread, from the built-in flash or an auxiliary illuminant, with a time varying intensity of illumination; using image analysis including edge and feature detection to detect wear indicators, presence/absence of grooves of different depths in known tread patterns; using time of flight information, detecting the difference in the time taken for light to be reflected from the surface of the tyre and the base of a groove.

The invention, in one aspect, comprises a method for inspecting a tyre, comprising forming a digital camera image of an area of the tread and subjecting the image to image analysis to give an indication of tyre condition.

The image may contain three dimensional information. When the tyre condition of which an indication is required involves tread depth, the image may be such as contains three dimensional information from which tread depth can be estimated. However, there are other possible indicators of tread wear.

Most if not all tyres have built-in tread wear indicators, raised lands of hard rubber moulded into the base of each groove, mostly 1.6 mm but sometimes 2 mm proud of the groove base. They are not very noticeable on a new tyre because they are well within the groove, but as the tread is worn down, they become more visible. When they are level with the tread surface, the tread depth is 1.6 mm or, as the case may be, 2 mm, usually regarded for the tyre in question as a safe, and, indeed, a legal limit, they merge with the tread surface. It would be a relatively simple matter to render wear indicators more useful by stepping them at, say, 2 mm intervals.

Edge detection in image analysis of a digital image of an area of tread that includes a tread wear indicator will reveal a groove edge when the indicator is below the tread surface, but not when it is level with it. The presence of the indicator can be revealed by detecting its transverse edges.

Much else can be detected from a digital image by image analysis, even if the image does not include a tread wear indicator. Tyres have a number of different types of groove with different depths. The main grooves, which completely encircle the tyre, are the deepest, but there are other grooves in the lands between the main grooves that are not so deep. When the tyre is worn down to the level of the shallowest of these grooves, they will cease to be picked up by an edge detector routine in an image analysis procedure.

Comparison of the image against an image of an unworn tyre will immediately indicate that the tyre has worn down at least to the depth of that particular groove. This may be tolerable for the shallower grooves, but if grooves that extend down to the minimum legal tread depth are obliterated, it may be deduced that the tyre is illegal and unsafe.

There is a finite number of tyre manufacturers, each producing a limited range of tyres with individual tread patterns. Images of each tread pattern can be stored in a database and a camera image can be compared against images in the database to find a best match. If there are tyres that do not have grooving appropriate to this approach, they can be identified by comparing the image against images in the database, and a different approach to tyre condition assessment adopted. However, it should not be too difficult to persuade all tyre manufacturers to include critical grooving in all their tread patterns, as it should not adversely affect tyre performance and should encourage motorists to change their tyres earlier than they might otherwise have done.

Image processing can involve resizing, allowing for camera-tread distance, light levels, viewing angle and viewing distance, image clean-up to "remove" dirt from the grooves and so forth.

Whether or not tread depth information can be had from wear indicator or groove absence observation, there are direct methods for assessing groove depth from a camera image. If, for example, the camera lens is situated centrally of the width of the tread, depth information about edgewise grooves can be calculated by trigonometry, provided, of course, that the lens is able to see the bottom of the groove. If, however, given a certain geometry, the lens cannot see the bottom of any groove, while tread depth may not be calculable, it may be inferred that the tread depth is adequate. A tangential view allows tread depth to be readily calculated from the known width of the groove. Two or more images may be taken from different positions.

In addition to tread depth, tyre pressure can also be determined, at least to the extent that an underinflated tyre can be distinguished from a properly inflated one. Image analysis can distinguish an underinflated tyre from a reference tyre by measuring the lateral bulge.

In this way, a simple digital camera can be used to capture the image, and that camera may be one already incorporated into a smartphone, which can be adapted by loading an app to perform necessary computation, communicate an image, or a set of images, to a remote computing facility where comparison can be made against a database and do any other thing that may be required. The app can also indicate what images should be taken, specifying camera positions and orientation. Comparison could also be done using the computing power of the smartphone.

As mentioned already, it is possible to use a digital camera that has Wi-fi functionality in conjunction with a smartphone, so that the smartphone can control the camera or at least download images made by the camera. 3D lenses are available for at least some digital cameras, and depth information can readily be extracted from images taken using one.

The smartphone may be adapted to communicate with a licensing or other authority to log an offence about which the vehicle owner may be contacted, and may be used in conjunction with, say, a traffic warden's ticket issuing machine to issue an appropriate ticket, which may range from a warning that a tyre is illegally worn, or nearly so, and should be changed, which may require proof within a given time limit that this has been done, up to an on-the-spot fine or a notice of intended prosecution. It may also communicate with an insurance company who may, in a particular situation, reduced premium policy, require regular or on-demand updates of tyre condition.

For traffic warden use, a wand may be provided, adapted to hold a smartphone or other imaging device near ground level, and this may include means to operate the imaging device remotely.

An app can be downloaded by any vehicle owner wanting an easy way to monitor tyre condition. In such case, communication with a database may be unnecessary—a vehicle has but a few tyres, even a commercial vehicle, and, even if there are four or twenty different tyres, the app could have its own in-phone mini-database of comparison images covering all the tyres on the vehicle. This would need to be updated, of course, when tyres were changed.

BRIEF DESCRIPTION OF THE SEVERAL VIEWS OF THE DRAWING

Methods and apparatus for assessing tyre tread depth and/or tyre condition according to the invention will now be described with reference to the accompanying drawings, in which.

DETAILED DESCRIPTION OF THE INVENTION

The drawings illustrate a method for assessing tyre tread depth and/or tyre condition by taking and analysing a camera image or images of a tyre using portable instrumentation. Images from which tyre tread depth and/or tyre condition may be assessed are shown in FIGS. 1 to 8.

Figure 1:
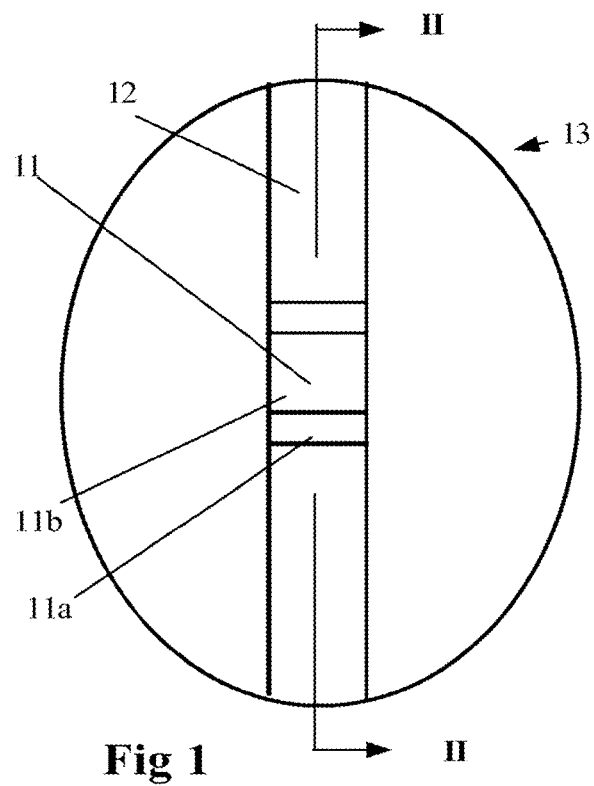
FIG. 1 is an image of an area of good tyre tread including a wear indicator.
Figure 3:
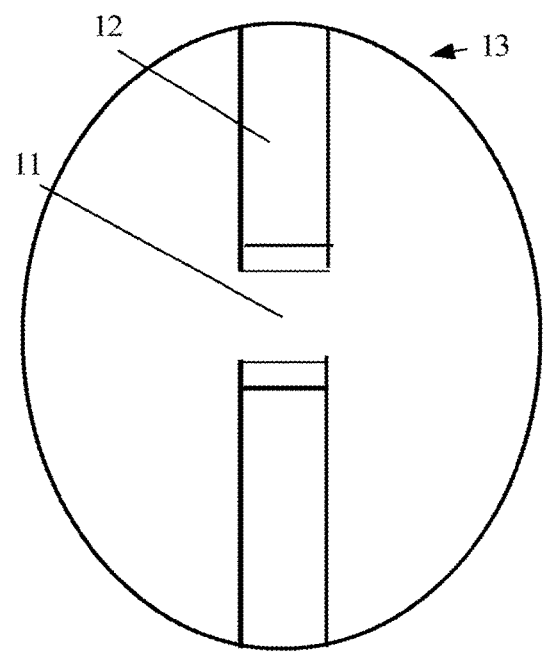
FIG. 3 is an image of a similar area indicating unacceptable tyre wear.
Figure 2:
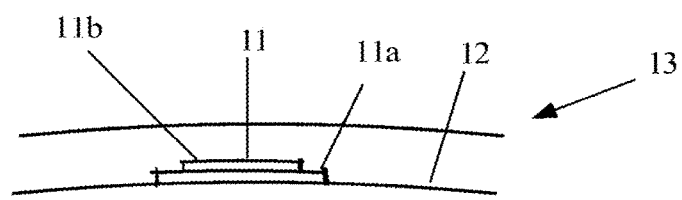
FIG. 2 is a section on the line II-II of FIG. 1.

FIGS. 1 to 3 illustrate the use of a tread wear indicator 11, which is a raised area at the bottom of a groove 12 of the tyre 13. Conventional wear indicators are simple blocks of rubber, but the indicator 11 is a two level indicator with levels 11a, 11b a millimetre apart. The tyre of FIGS. 1 and 3 is new, while that of FIG. 2 is worn down to level 11b. The edges of the groove 12 have disappeared, and this disappearance is detectable by edge detection algorithms in image processing software. In this case, the tyre has not yet worn down to level 11a at which more of the edges will have disappeared. Wear down to level 11b may be taken to indicate that tyre should be replaced, wear down to level 11a that it is already down to its legal limit.

Figure 4:
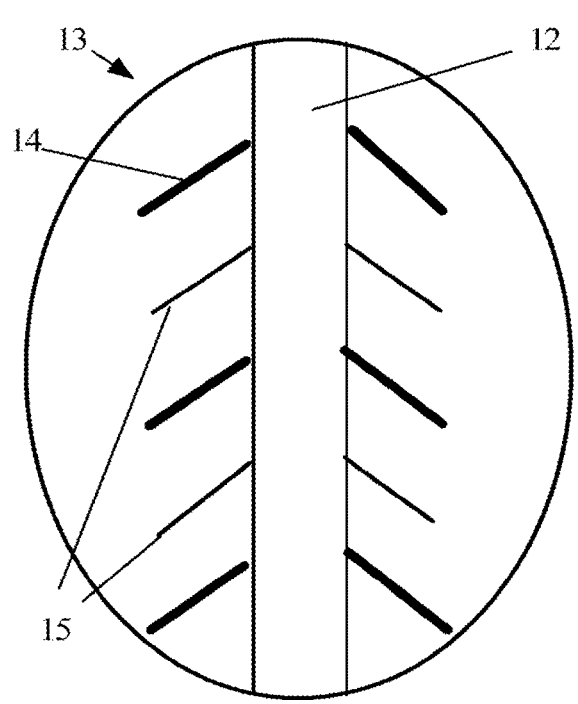
FIG. 4 is an image of an area of good tyre tread having graded depth grooves.
Figure 5:
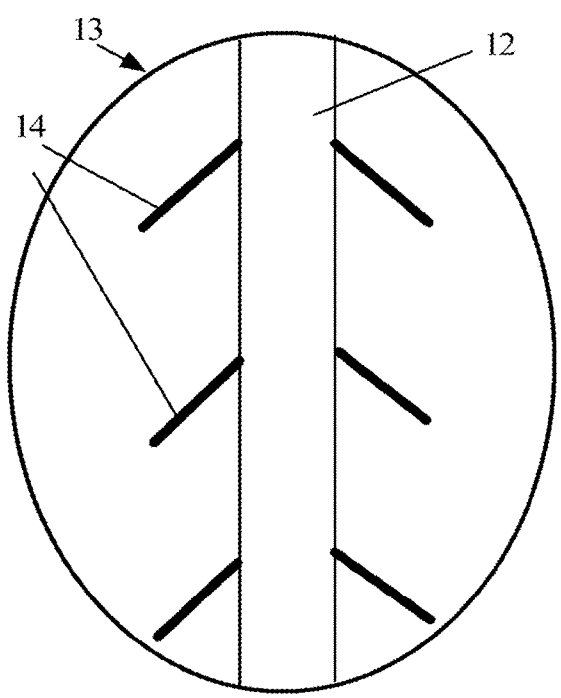
FIG. 5 is an image of a similar area indicating tyre wear.

FIGS. 4 and 5 illustrate the use of graded depth tread grooves. FIG. 4 shows grooves 14, 15 extending laterally from main groove 12. Grooves 14 extend down to the base of groove 12 but grooves 15 only to 1.6 mm above the base of grove 12. When, as in FIG. 5, grooves 14 no longer appear in the image, the tread is at its legal limit.

Figure 6:
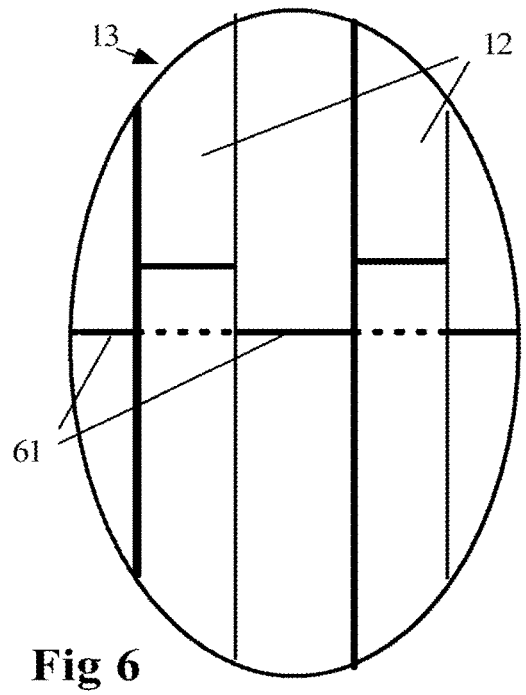
FIG. 6 is an image of a deep tread with a projected line.
Figure 7:
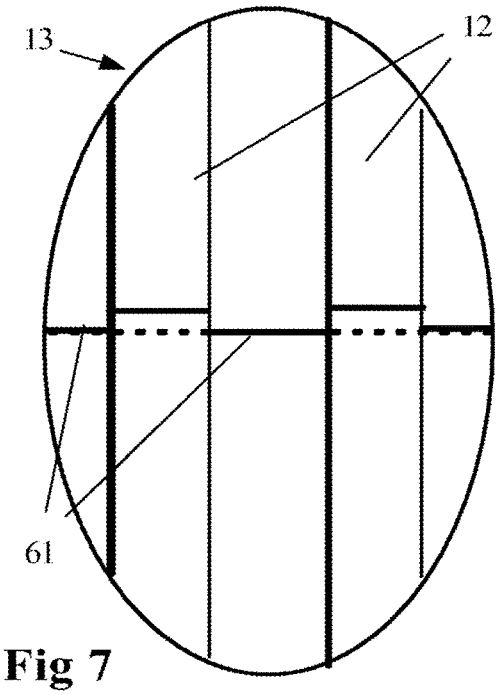
FIG. 7 is an image like FIG. 6, of a shallow tread.

FIGS. 6 and 7 illustrate the assessment of tread depth using a line image 61 projected on to the tyre from a position offset from the camera. The broken line show where the image would appear on a flat surface, the solid line where it appears in the camera image due to parts of it falling on the bases of grooves 12. In FIG. 6, the grooves are deeper, and the line image is displaced more than in FIG. 7, where the grooves are shallower.

This could be used with an ancillary projector arrangement, which might comprise simply a clip-on slit collimator for the smartphone camera flash. However, a line scan facility akin to a QRC reader can be built in to a smartphone app.

Figure 8:
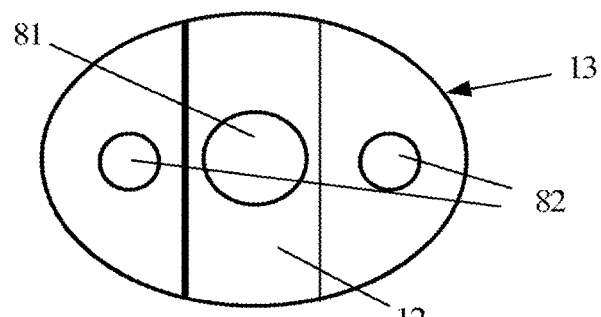
FIG. 8 is an image of a deep tread with lit with projected circular conical beams.

FIG. 8 shows an image of a tread area including a groove 12 on to which conical light beams are shone. The base of groove 12 being further from the light source, the more the beam has spread out and the larger the image 81 as compared with the images 82 on the tyre surface, giving a simple way of assessing tread depth. Again, this could be used with an ancillary projector arrangement that could be a clip-on. If, instead of discrete conical beans, a single diverging beam spread across the tread is used, the image will comprise a band of varying width which will be essentially a profile of the tread.

The methods described with reference to FIGS. 1 to 8 are illustrative of various ways in which depth information can be derived from images. Other ways include triangulation from images from a binocular exposure, as might be made by displacing the camera between images or by using a binocular lens—here, a separate interchangeable lens digital camera fitted with a stereo lens might be used for the imaging, especially one with Wi-fi provision that could communicate with and be controlled by a smartphone.

Figure 9:
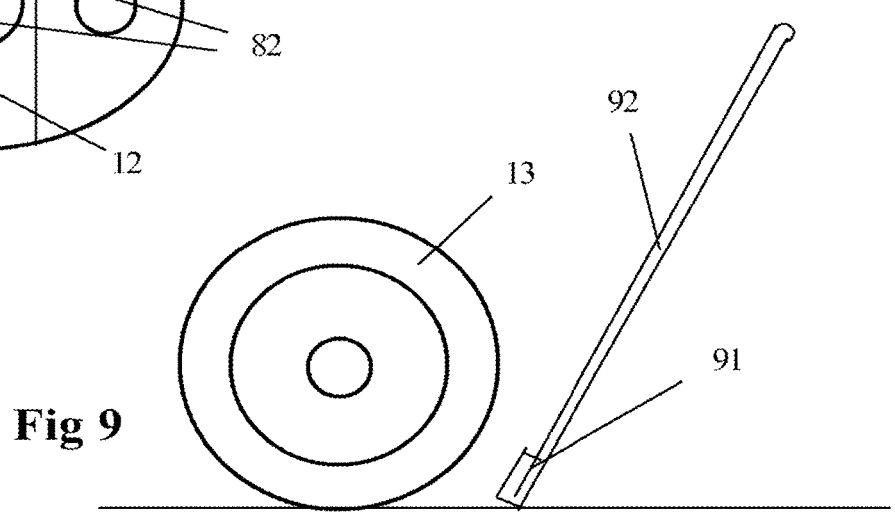
FIG. 9 is a view of a wand used for placing a smartphone or other camera at ground level to image a tyre tread.

FIG. 9 illustrates how a traffic warden can readily access tyres of parked vehicles using a smartphone 91 deployed on a wand 92, that might be telescopically extendable.

Figure 10:
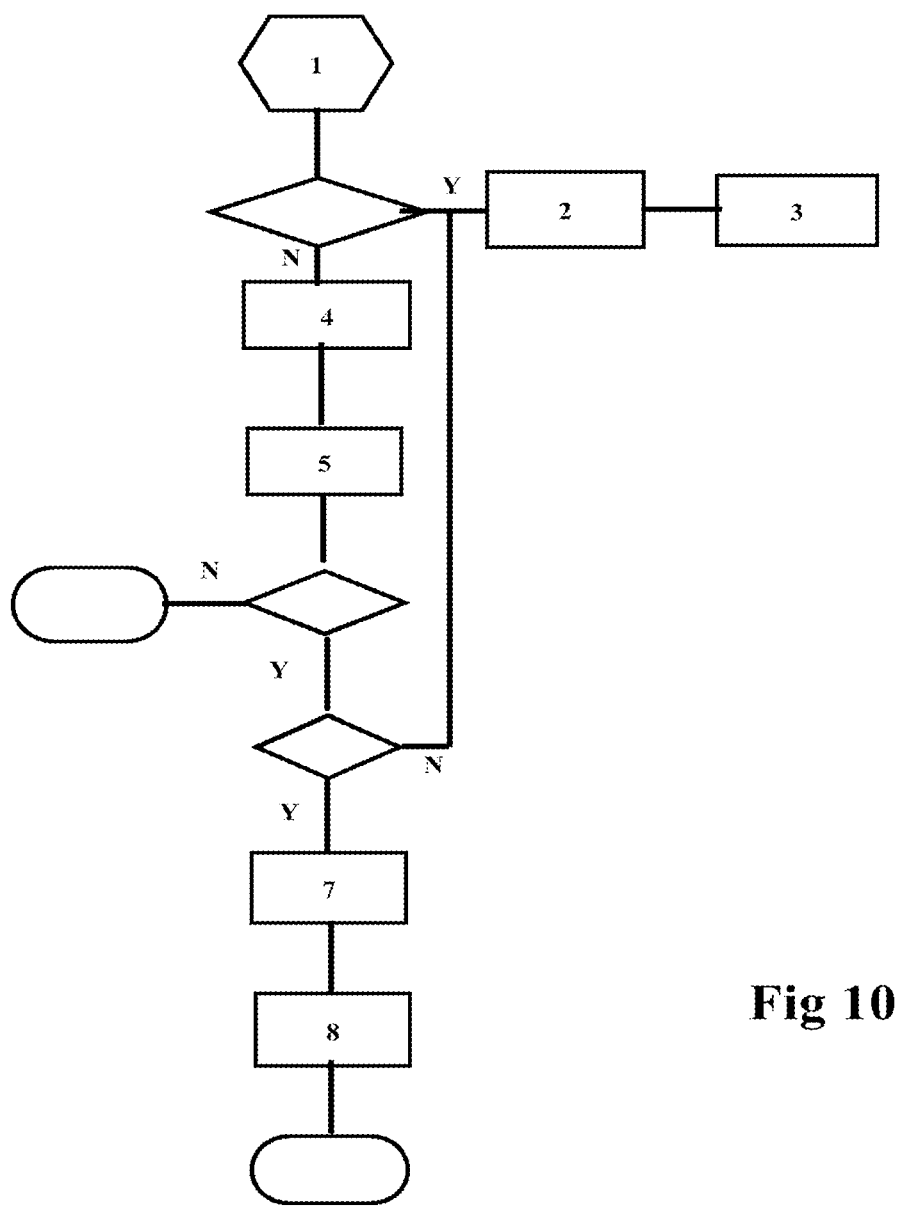
FIG. 10 is a flow chart showing a sequence of steps in assessing tyre tread depth and tyre condition.

The flow chart of FIG. 10 illustrates the method as it would be carried out by a traffic warden using a typical ticket-issuing machine.

At the start of the procedure, a vehicle is assessed—step 1—to see if it is illegally parked or has anything else obviously wrong with it, such as an out-of-date road fund license disc. If the decision is Yes, then a file is created—step 2—in the machine 14, and details of the vehicle—such as its registration number, type, colour and so forth, from which it may be identified—and of the offence, are entered—step 3—into the file via the keyboard or keypad 14a on the ticket-issuing machine.

If no such offence is noted, no file is created, but a visual assessment of tyre condition may be made, and, if it appears that at least one tyre may be defective, the record 12 is made—step 4—by equipment in or associated with the machine 14, as will be described more particularly below.

This record is then assessed—step 5—again as will be described below, and a decision taken as to whether the tyre or one of the tyres is defective. If the decision is No, the procedure ends, and the warden moves on to another vehicle, and the record is discarded.

If the decision is Yes, the question is then asked whether a file has already been created at step 2. If the decision is No, then a file is created—step 2—and the vehicle details entered. If the decision is Yes, as, indeed, it will be after the file has been created after a No decision at this stage, then the record is added to the file—step 7—and the file actioned—step 8. By "actioned" is meant, for example, printing a parking ticket or a tyre wear warning notice or a defective tyre offence notice, and storing the file for downloading to a master database, whether by a block downloading at the end of a shift or regular downloading by radio link so that a supervisor may take a decision on further action. The procedure then terminates.

The ticket-issuing machine is hand-held or carried on a strap and comprises the usual keypad and indicator screen by which details of a vehicle and a parking or other offence can be entered, and a ticket printing mechanism for printing a ticket. In addition, it has record-creation apparatus by which a record of then tyre tread can be made for analysis as by software within the machine. The record-creation apparatus comprises a camera and a flash that can be aimed at the tyre tread. In imaging mode, which can by initiated by a keypad input, the screen can display the image seen by the camera, so that the warden can aim the camera properly. An auto focus arrangement can advise, e.g. through a screen icon, when the camera is at a correct distance.

A GPS function may be included in the ticket issuing machine that can be used to verify the position of a vehicle at a certain point in time, and this can back up a traffic warden's personal testimony.

The smartphone app controls and directs the control of the camera, whether it is the camera of the smartphone or one controlled by Wi-fi. Directing the control includes giving on-screen (and/or audio) instruction to the operator as to where to place and point the camera, for example by indicating on a screen diagram which wheel to image and showing by another diagram how to align the camera with the tread. Controlling the camera includes detecting from the screen image when the focus and light are right and taking the shot, quality-assessing the image recorded and repeating the shot if necessary, and displaying the next operator instruction, and, when all necessary images have been recorded, effecting the image analysis routines either on board the smartphone or by sending data to a remote computer.

An app suitable for downloading by motorists wishing to be able to check their tyres regularly and easily can guide them through the process.

An initialising screen may request user/vehicle information, which may be saved for future checks. The vehicle information will include the number of tyres.

The app will then direct the user to proceed to tyre #1, identified, perhaps, by a diagram, especially for multi-wheeled goods vehicles, and, by another diagram, indicate where in relation to tyre #1 the camera should be placed. This first image may be quickly analysed to check on correct camera alignment and to request repositioning for a second image if necessary. This first image can be used to access a database to identify the tyre. The database may be remote, accessed by in internet or USSD link, or, may be a small database carried in the smart phone for a single user on one or a small number of vehicles.

Image processing software can run edge and corner detection routines such as as SIFT (Scale Invariant Feature Transform) and FAST corner detection to derive a compressed descriptor unique to a tyre type, rather than use the full image for comparison, which saves on processing and communication time. The routines are designed to be sufficiently robust to identify tyre type even though the object tyre is worn to a greater or lesser extent, and this is achieved by selecting salient features that survive wear, such as the dimensions of the main grooving, ignoring features such as shallower grooving that may not be present on the worn tyre.

Having identified the tyre type, the app may then instruct the user to take another image or images, more appropriate to taking measurements.

The app then calls up image processing software to assess the tyre for wear using one or more of the techniques described above.

Having dealt with tyre #1, the app can then call on the user to visit the other tyres an a particular order, identified again, possibly, by a diagram, and repeat the procedure as many times as there are tyres. In this way, the app can check for inappropriate combinations of cross ply and radial tyres. Identifying vehicle structure images with the tyre can be used to confirm that the correct order has been followed, or even to dispense with the need to go in any particular order, identifying which tyre is imaged from its location as evidenced by the adjacent structure, and eliminating the possibility that one good tyre has been imaged multiple times.

Having completed the tyre analysis, the app can then communicate the result to an insurance company, for example, who might require regular or on-demand checks to keep the insurance validated, and even, when tyre replacement is indicated, seek out tyre suppliers and check prices and initiate purchases and/or appointments at a garage or tyre fitting establishment.

Regular, e.g. monthly, checks can be used to assess tyre wear rate on a "mm wear per thousand mile", or a "percentage allowable wear per thousand mile" basis, which may require mileage input from time to time. This will predict when tyres will need changing but might also, if wear appears to be excessive, suggest a modification of driving technique. If the entire width of the tread is imaged, it would also be possible to spot uneven tyre wear that would flag up a suspension or tracking problem.

The invention claimed is:

1. A method for assessing tyre condition of a tyre for a vehicle, the method comprising:

taking and analysing, using instrumentation, a camera image or multiple camera images of a tyre;

using image processing software, implemented on or controlled by the instrumentation, to measure tyre condition by performing edge and feature detection image analysis on the camera image or the multiple camera images to select salient features that survive wear, including dimensions of the main grooving of the tyre, wherein the edge and feature detection image analysis is performed on the camera image or the multiple camera images to detect traverse edges of a groove edge and corner features, after which the image processing software runs edge and corner detection routines to derive a compressed descriptor unique to a tyre type to assess the tyre condition; and then having completed the edge and feature detection image analysis, communicating the tyre condition and tyre brand and/or tyre model to a user.

2. A method according to claim 1, in which the instrumentation comprises communication equipment including a camera.

3. A method according to claim 2, in which the communication equipment is portable and comprises a smartphone and a separate imaging device is used in conjunction with the smartphone.

4. A method according to claim 2, in which the communication equipment is portable and comprises a smartphone loaded with an app that controls or directs the control of the camera, whether a built-in smartphone camera or an auxiliary camera, to take the camera image or the multiple camera images, wherein the app contains the image analysis software that assesses the tyre condition on board the smartphone or communicates image data to a remote computer adapted to make such assessment and communicate the assessment back to the smartphone, and any combination thereof.

5. A method according to claim 4, in which the app is an image control app that controls a tyre condition imaging process.

6. A method according to claim 1, comprising a method for measuring the tyre condition comprising forming a stereo image by taking two or more images from spaced camera locations across the tyre and around the tyre, using triangulation or other depth extraction methods; or using structured light, as by projecting, from the built-in flash or an auxiliary illuminant, a line across tread and sidewall features of the tyre from a position displaced from the camera lens axis and the tyre condition from the observed displacement; or using modulated light, as by illuminating the tread and sidewall features, from the built-in flash or an auxiliary illuminant, with a time varying intensity of illumination; or using time-of-flight information, detecting the difference in the time taken for light to be reflected from the surface of the tyre and the base of a groove and any combination thereof.

7. A method according to claim 1, in which the image is compared to images stored in a database to identify the brand and model of the tyre, or the user is required by a screen prompt to enter tyre identification data read off the sidewall of the tyre.

8. A method according to claim 1, in which the instrumentation communicates with an enforcement agency and/or an insurance company regarding the tyre condition.

9. A method according to claim 1, in which the instrumentation is portable and comprises a smartphone loaded with an app that controls image analysis of the image, wherein:
the app interactively guides a user through steps of a tyre inspection program; and
the app instructs positioning of the smartphone for image formation.

10. A method according to claim 9, in which the app communicates with:
a database to identify a tyre, or
an enforcement agency or an insurance company regarding the tyre condition and any combination thereof.

11. Apparatus for assessing tyre condition of a tyre for a vehicle, the apparatus comprising instrumentation, the instrumentation comprising tyre imaging and image analysis means for:
taking and analysing a camera image or multiple camera images of a tyre using the instrumentation; and
using image processing software, implemented on or controlled by the instrumentation, to measure tyre condition by performing edge and feature detection image analysis on the camera image or the multiple camera images to select salient features that survive wear, including the dimensions of the main grooving of the tyre, wherein the edge and feature detection image analysis is performed on the camera image or the multiple camera images to detect traverse edges of a groove edge and corner features, after which the image processing software runs edge and corner detection routines to derive a compressed descriptor unique to a tyre type to assess the tyre condition; and
having completed the edge and feature detection image analysis, communicating the tyre condition and tyre brand and/or tyre model to a user.

12. Apparatus according to claim 11, in which:
the instrumentation comprises portable communication equipment including a camera; or
the instrumentation comprises portable communication equipment including a smartphone and a separate imaging device is used in conjunction with the smartphone and any combination thereof.

13. Apparatus according to claim 11, comprising deployment means adapted to deploy imaging means at an imaging position with respect to a tyre.

14. Apparatus according to claim 13, in which said deployment means comprises a wand adapted to hold a smartphone or other imaging device near ground level.

15. A method according to claim 10, including the user seeking out tyre suppliers and checking prices and initiating purchases and/or appointments at a garage or tyre fitting establishment.

* * * * *

UNITED STATES PATENT AND TRADEMARK OFFICE
CERTIFICATE OF CORRECTION

PATENT NO.        : 10,907,959 B2
APPLICATION NO.   : 16/372976
DATED             : February 2, 2021
INVENTOR(S)       : Rhoades Page 1 of 1

It is certified that error appears in the above-identified patent and that said Letters Patent is hereby corrected as shown below:

In the Claims

Column 8, Line 14, delete "traverse" and substitute therefore -- transverse --.

Column 10, Line 3, delete "traverse" and substitute therefore -- transverse --.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*